United States Patent [19]

White

[11] Patent Number: 4,629,296
[45] Date of Patent: Dec. 16, 1986

[54] ADJUSTABLE CONVEX MIRROR ASSEMBLY FOR A VEHICLE MIRROR

[75] Inventor: Russell L. White, Grandview, Mo.

[73] Assignee: Peterson Manufacturing Company, Grandview, Mo.

[21] Appl. No.: 600,102

[22] Filed: Apr. 13, 1984

[51] Int. Cl.[4] ............................ G02B 5/08; G02B 5/10
[52] U.S. Cl. .................................. 350/624; 350/625; 350/626; 350/632
[58] Field of Search ................ 350/624, 625, 626, 632

[56] References Cited

U.S. PATENT DOCUMENTS

| 2,137,286 | 11/1938 | Herbig | 350/632 X |
|---|---|---|---|
| 3,104,274 | 9/1963 | King | 350/625 |
| 3,146,296 | 8/1964 | Fischer | 350/625 |
| 3,337,285 | 8/1967 | Travis | 350/61 |
| 3,375,053 | 3/1968 | Ward | 350/625 |
| 3,404,935 | 10/1968 | Creager . | |
| 4,182,552 | 1/1980 | Feinbloom . | |
| 4,200,359 | 4/1980 | Lawson . | |
| 4,223,983 | 9/1980 | Bloom . | |
| 4,526,446 | 7/1985 | Adams | 350/624 |

Primary Examiner—John K. Corbin
Assistant Examiner—Richard F. Gallivan
Attorney, Agent, or Firm—Litman, Day & McMahon

[57] ABSTRACT

A selectively adjustable convex mirror assembly for allowing a motor vehicle operator to see alternative rear views comprises a cylindrical housing and a circular convex mirror positioned in the housing. The housing is rotatably mounted on a swivel mechanism. The mirror is mounted in the housing in such a manner that rotation of the housing upon the swivel mechanism moves the convex mirror through a plurality of reflective orientations. A locking and indexing mechanism is provided to retain the housing in a selected position relative to the swivel mechanism and to provide for controlled and incremental rotation of the housing about the swivel mechanism. The entire assembly is secured to a planar mirror surface of an outside rearview mirror of a motor vehicle.

21 Claims, 4 Drawing Figures

ADJUSTABLE CONVEX MIRROR ASSEMBLY FOR A VEHICLE MIRROR

BACKGROUND OF THE INVENTION

The present invention relates to convex mirrors, and in particular to an adjustable convex mirror assembly for use in cooperation with a motor vehicle to provide an adjustable rear view to an operator of that vehicle.

Convex mirrors have been utilized in part for rearview mirrors; however, conventional convex rearview mirrors are generally circular convex mirrors that are symmetrically mounted relative to a planar mounting surface or rotate about an axis parallel to the mounting surface. Such mirrors may be mounted on a mirror surface of a substantially planar outside rearview mirror of a vehicle, such as a truck. A field of view reflected by such conventional convex rearview mirrors, to the operator or driver of the motor vehicle, is typically not adjustable independently of adjustment of the planar mirror itself, or is only very limitedly adjustable.

Numerous problems are associated with positioning and focusing of such convex rearview mirrors. For example, a particular vehicle driver may prefer different orientations for the convex rearview mirror depending upon whether the vehicle is operated in city traffic or highway traffic and at night or in the day. Additionally, different orientations may be preferred for operating the vehicle in forward and reverse directions. Further, as operators of the vehicle change, preferences for the positioning of the convex rearview mirror may change also.

Another problem with conventional convex rearview mirrors is that the method of attachment of the convex mirror to the planar mirror surface is normally pseudopermanent. Thus, if the person mounting the convex mirror places it is a wrong position, or if it is later desired to move the mirror to a new position, there may be very little that can be easily done about it.

Of course the planar rearview mirror may itself be adjustable. However, the desired orientation of the convex mirror relative to the planar mirror may change as the driving conditions, and/or the driver vary. Therefore, it is preferable that the convex rearview mirror be adustable independently of the planar rearview mirror to which it is attached. Additionally, it is advantageous for the adjustability to be controlled and incremental by an indexing mechanism associated with the adjustment so that the vehicle operator may easily find the preferred orientation for any given driving situation and thereafter easily repeat that orientation the next time that same driving situation presents itself.

The outside rearview mirror of a motor vehicle is subject to substantial vibration during vehicle operation. Also, the mirror will be subject to high winds and inclement weather. Therefore, the adjustable convex rear view mirror assembly preferably includes a locking mechanism for retaining the mirror in the selected orientation and withstanding potentially harsh operating conditions.

OBJECTS OF THE INVENTION

Therefore, the objects of the present invention are: to provide an adjustable convex rear view mirror assembly suited for mounting upon a substantially planar outside rearview mirror of a motor vehicle; to provide such an assembly in which the convex mirror is adjustable in orientation by an operator for reflecting a view, selected from a plurality of available views; to provide such an assembly in which the position of the convex mirror is adjustable independently of the position of the planar mirror; to provide such an assembly in which adjustment of the orientation of the convex mirror is both periodic and incremental; to provide such an assembly in which the orientation of the convex mirror is substantially lockable against unintended movement under the normal conditions of use but easily adjustable when movement is intended; to provide such an assembly which is particularly adapted for an extensive lifetime under the conditions of its use; to provide such an assembly which is relatively easy to deploy and adjust; to provide such an assembly which is relatively inexpensive to produce; and to provide such an assembly which is easy to manufacture, simple to use, and which is particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

An adjustable convex rearview mirror assembly is provided for mounting upon a substantially planar outside rearview mirror of a motor vehicle and for providing adjustment of an associated convex rearview mirror through a plurality of reflective orientations independently of the position of the substantially planar rearview mirror. The assembly comprises a housing, a convex mirror, a swivel mechanism, and locking and indexing mechanisms.

The housing is rotatably mounted upon the swivel mechanism and the convex mirror is retained within the housing in such a manner that rotation of the housing upon the swivel mechanism passes the convex mirror through a plurality of reflective orientations. The locking mechanism permits retention of the convex mirror in a selected orientation and the indexing mechanism provides for selective and incremental rotation of the housing upon the swivel mechanism and therefore controlled adjustment of the orientation of the convex mirror.

When used in cooperation with a substantially planar outside rearview mirror of a motor vehicle, the convex mirror assembly is mounted thereon by an adhesive attached to a rear mounting surface of the swivel mechanism.

Once the convex mirror assemby is in position on a motor vehicle, an operator of the vehicle may adjust the orientation of the convex mirror by rotation of the housing upon the swivel mechanism. The indexing mechanism permits the operator to easily locate and relocate an orientation of preference, while the locking mechanism retains the housing in the selected orientation and prevents unintended movement caused by vibration of the vehicle or weather forces.

The drawings constitute part of this specification and include exemplary embodiments of the present invention and illustrate various objects and features thereof.

DETAILED DESCRIPTION OF THE PREFERRED EMBODIMENT

Figure 1:
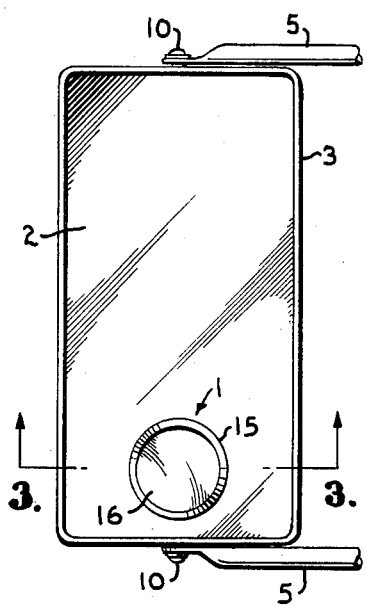
FIG. 1 is a fragmentary, front elevational view of a mirror assembly according to the present invention mounted upon a substantially planar, outside rearview mirror of a motor vehicle.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an adjustable convex rear view mirror assembly according to the present invention.

In FIG. 1, the assembly 1 is shown mounted upon a planar mirror surface 2 of an outside rearview mirror 3. The planar outside rearview mirror 3 is mounted upon a motor vehicle (not shown) by brackets 5. It is foreseen that types of planar outside rearview mirrors other than mirror 3 may be used in cooperation with the present assembly 1. The outside mirror 3 shown is adjustable about an axis defined between ends 10 of the brackets 5.

The assembly 1 includes a housing 15, a convex mirror 16 and a swivel mechanism 17. The housing 15 is rotatably mounted upon the swivel mechanism 17. The convex mirror 16 is positioned within the housing 15, as described below, such that the rotation of the housing 15 about the swivel mechanism 17 moves the convex mirror 16 through a plurality of reflective orientations relative to a stationary viewer.

Figure 3:
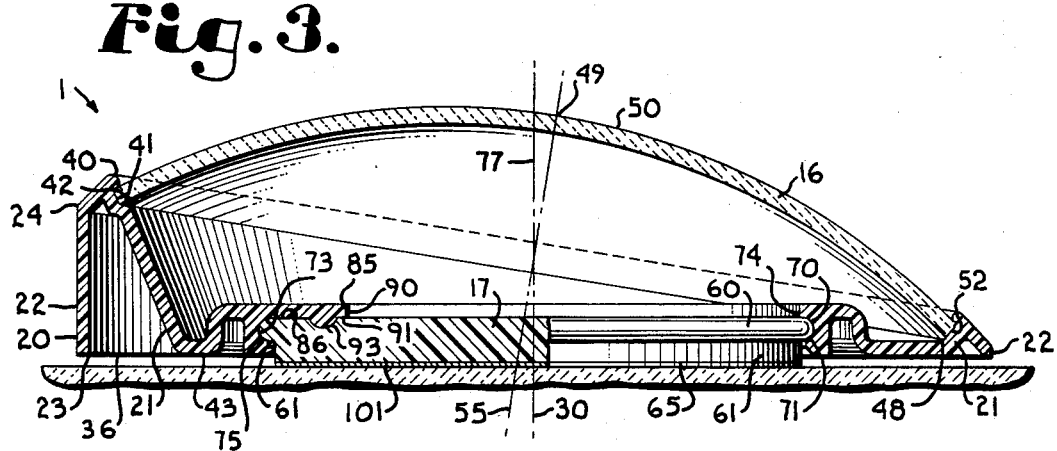
FIG. 3 is an enlarged and cross-sectional view of the mirror assembly, taken along line 3—3 of FIG. 1.
Figure 4:
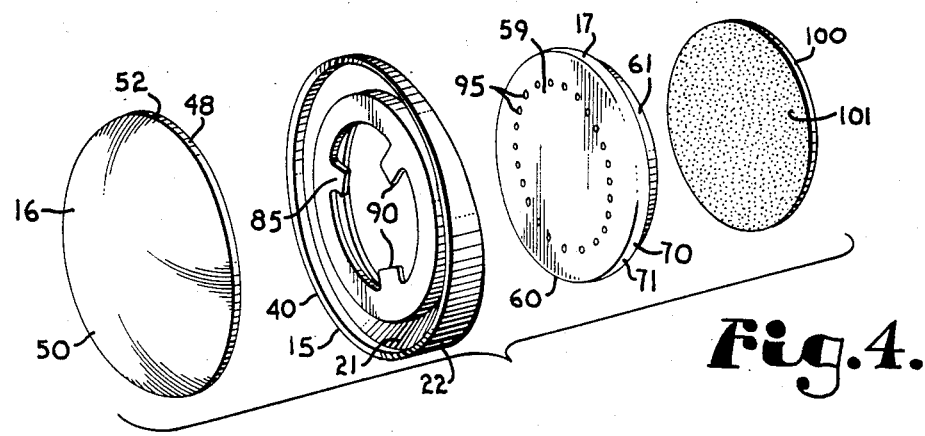
FIG. 4 is an enlarged and exploded perspective view of the mirror assembly.

With reference to FIG. 3, the mirror housing 15 comprises a truncated cylinder 20 having an inner skirt or sidewall 21, an outer sidewall 22, a circular edge 23 at a distal end of the sidewall 22 and an angularly truncated or oblique surfaced connecting structure 24 joining the inner sidewall 21 with the outer sidewall 22. The housing 15 is constructed from a suitable material, such as a molded plastic, for the application described herein. The housing 15 has a centrally located axis 30 passing through the center of the cylindrical sidewall 22 and being perpendicular to the circular edge 23. The housing circular edge 23 defines a plane passing therethrough which in turn delineates the bottom or circular base 36 of the housing 15.

The inner sidewall 21 of the housing 15 is attached to the outer sidewall 22 near the oblique end 24 and slants inwardly therefrom as it extends toward the circular base 36 of the housing 15. The inner sidewall 21 includes an upper end 40, a lip or shelf 41, a slot 42 having on one side thereof the shelf 41, and a base portion 43. The base portion 43 of the inner sidewall 21 is substantially coplanar with the circular base 36 of the outer sidewall 22. The slot 41 is positioned between the sidewall end 40 and the sidewall base portion 43 and extends generally in a radially outward orientation into the sidewall 21.

The convex mirror 16 is circular at a base 48 thereof and has a crown 49. The mirror 16 further has a reflecting surface 50 and an outer periphery 52. The illustrated mirror 16 is geometrically a truncated and hollow sphere having a fixed radius and curvature over the entire surface 50. Because of its geometry, the convex mirror 16 possesses circular symmetry and has an axis of symmetry 55 passing through the crown 49. The mirror 16 is mounted within the housing 15 such that the outer periphery 52 is snugly received into the slot 42 so as to form an interference fit which substantially inhibits removal of the mirror 16 from the housing 15. That is, the housing upper end 40 wraps about the mirror base 48 after the mirror 16 is positioned, such that the mirror base 48 is in the slot 42, while the housing 15 is still warm and pliable during manufacture and is resiliently held therein when the material of the housing 15 cools so as to form a unitary component between the housing 15 and the mirror 16. The slot 42 is circular and positioned within the inner side wall 21 such that the convex mirror 16 is mounted with the axis-of-symmetry 55 non-coplanar with the axis 30 of the housing 15. This arrangement permits a different field of view to be reflected to a stationary viewer as the housing 15 is rotated about the axis 30.

The housing 15 is rotatably mounted upon the swivel mechanism 17 such that the base of the mirror 48 defines a plane which is at an acute angle (that is, not perpendicular and not parallel, as illustrated here approximately 8.5°) with a plane defined by the housing base 36 which in turn is generally parallel to the planar surface 2. The swivel mechanism 17 includes a circular plate 59 having an outer track or circumferential continuous tongue 60 around the periphery or radially outward edge thereof and an annular stand portion or pedestal 61. The pedestal 61 includes a rear mounting surface 65 substantially perpendicular to the housng axis 30.

The tongue 60 includes an outer annular ring 70 having a radially outward ridge 71 with a generally semicircular cross-section. The housing 15 includes a circumferential channel or groove 73 on a radially inner surface thereof such that the groove 73 opens toward the housing central axis 30. The groove 73 is molded from flexible plastic and is integrally connected to the base portion 43 of the inner side wall 21. The groove 73 is sized to slidably receive the circular tongue 60 in a tongue-and-groove arrangement allowing 360° rotation of the housing 15 about the axis 30 relative to the swivel mechanism 17. Ridges 74 and 75 on either side of the groove 73 retain the tongue 60 within the groove 73 after the plate 59 has been press-fitted therein. The frictional engagement between the tongue 60 and the groove 73 is such that the housing 15 may be rotated about the tongue 60, with the rotation defining an axis of rotation 77, shown here as colinear with the longitudinal axis 30 of the housing 15.

Locking means and indexing means, here shown as three biased and resilient projections or leaf-spring devices 85 in the housing 15 provide for retention of the housing 15 in a selected position relative to the swivel mechanism 17 and provide for controlled and incremental rotation of the housing 15 about the axis-of-rotation 77.

Each leaf-spring device 85 engages a surface 86 of the plate 59 and comprises a rectangular tab 90 flexibly attached to the inner wall 21 of the housing 15 and extending radially inward therefrom. A surface 91 of each rectangular tab 90 faces the opposite surface 86 of the plate 59 and has a follower projection or knob 93 thereon. The plate 59 includes a plurality of apertures, depressions, or knob receivers 95 therein for engagement with the follower knobs 93. The plate knob receivers 95 are arranged in a generally circular pattern in the surface 86 of the plate 59 at a fixed radial distance from the center of the plate 59 and are positioned for alignment with the follower knob 93 of each rectangular tab 90.

Figure 2:
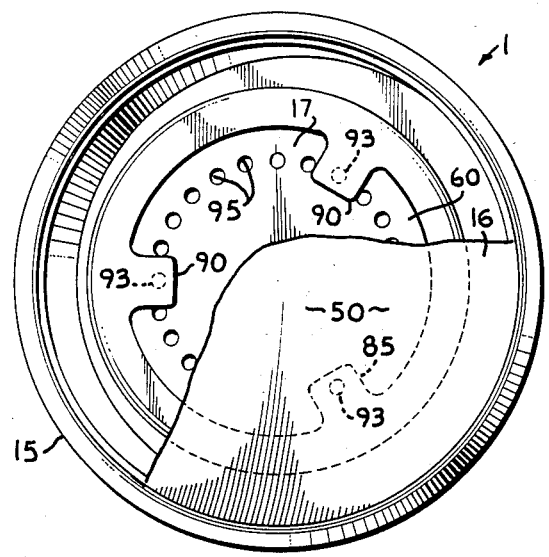
FIG. 2 is an enlarged front elevational view of the mirror assembly with portions broken away to show detail thereof.

To lock the housing 15 in a selected position relative the swivel mechanism 17, the housing 15 is rotated until the follower knobs 93 associated with the rectangular tabs 90 each engage one of the knob receivers 95, FIG. 2, so as to be biased thereinto by the leaf-spring device 85 associated therewith. Once the knobs 93 are received in the knob receivers 95, a substantial rotational force must be applied to the housing 15 by an operator to bias the leaf-spring device 85 away from the surface 86 and the knobs 93 out of the knob receiver 95, so that the housing 15 may be rotated to a new position relative to the swivel mechanism 17. Incremental adjustment in the position of the housing 15 is provided by rotation of the housing 15 until the follower knobs 93 engage the next receiver 95 in sequence. In particular, the rectangular tabs 90 flex relative to the housing inner side wall 21 so that locking by the knobs 93 in the knob receivers 95 may be selectively broken by rotative force applied to the housing 15 relative to the swivel mechanism 17.

Mounting means shown as disc 100 is used in cooperation with the assembly 1 to mount the assembly 1 onto the planar surface 2 of the outside rearview mirror 3. The disc 100 comprises double walled tape 101 which secures the disc 100 to the rear mounting surface 65 of the swivel mechanism 17 and to the planar surface 2.

In construction, it is preferred that the housing 15 be constructed of a durable, flexible plastic for which an outside diameter of approximately 4 inches has been found to be quite suitable for applications where the assembly 1 is used on a truck rearview mirror such as the illustrated planar surface 2. Further, in such an assembly the convex mirror 16 has a base diameter of approximately 3.75 inches and an effective spherical radius of approximately 5 inches. While the mirror shown is spherical, it is foreseen that other shapes, especially those symmetrical about a central axis such as parabolic, would be functional relative to certain features of the invention; however, a spherical mirror cooperates very effectively with all aspects of the invention.

In addition, the convex mirror 16 is mounted within the housing 15 such that the axis-of-symmetry 55 of the convex mirror 16 intersects the axis of rotation 77, as shown in FIG. 3, and forms an angle of approximately 8.5 degrees therewith.

As is illustrated, the incremental rotation for the housing 15 relative to the swivel mechanism 17 is approximately 7.5 degrees between locations where the knobs 93 engage and are biased into the knob receivers 95. Therefore, the plate 59 has forty-eight evenly spaced index apertures or receivers 95 therein. There are three indexing tabs 90 mounted 120 degrees apart from one another within the housing inner side wall 21. It is noted that the receivers 95 may be simple depressions in the plate 95, as are shown, or may be apertures passing entirely through the plate 59.

The dimensions and geometry noted above have been found to yield a highly functional adjustable convex mirror assembly 1 for mounting upon the planar rearview mirror surface 2 of a motor vehicle such a truck. The particular combination of the angle of reflection of the convex mirror with the selected degree of incremental rotation is found to provide the viewer with a broad and useful range of selectable rear views; however, it is foreseen that other dimensions and angles-of-reflection may be utilized according to the present invention. Accordingly, it is to be understood that while certain forms of the present invention have been illustrated and described herein, it is not to be limited to the specific forms or arrangement of parts described and shown.

What is claimed and desired to be secured by Letters Patent is as follows:

1. An adjustable convex mirror assembly, adapted to be mounted on a motor vehicle, said assembly comprising:
   (a) a housing;
   (b) a mirror mounted on said housing;
      (i) said mirror having a convex reflecting surface; and
   (c) a swivel mechanism connected to and cooperating with said housing;
      (i) said housing swivel mechanism having a substantially planar rear mounting surface for mounting said assembly on the vehicle;
      (ii) said housing being rotatably connected to said swivel mechanism such that said housing has an axis-of-rotation associated therewith; said axis-of-rotation being generally perpendicular to said swivel mechanism rear mounting surface;
      (iii) said mirror being asymmetrically positioned relative to said axis-of-rotation such that rotation of said housing results in movement of said convex mirror through a plurality of different reflective orientations;
   (d) whereby rotation of said mirror housing permits selection of a field of view, as reflected by said convex mirror, to a viewer.

2. A mirror assembly according to claim 1 wherein:
   (a) said convex mirror has a circular base and a center with a rotational axis-of-symmetry passing through said center; and
   (b) said convex mirror axis-of-symmetry is not co-linear or parallel with said housing axis-of-rotation.

3. A mirror assembly according to claim 2 wherein:
   (a) said mirror housing comprises an angularly truncated cylinder having a circular base and an oblique edge opposite said base;
   (b) said convex mirror is mounted near said oblique edge; and
   (c) said housing axis-of-rotation comprises a longitudinal axis of said cylinder.

4. A mirror assembly according to claim 3 wherein:
   (a) said swivel mechanism includes a circular edge with a radially outward projecting tongue; and
   (b) said housing circular base has a circumferential groove therein;
      (i) said housing being mounted on said swivel mechanism such that said tongue is slidably rotatable in said groove;
      (ii) said groove retaining said tongue relative to said housing and permitting rotation of said housing about said swivel mechanism.

5. A mirror assembly according to claim 1 including:
   (a) locking means for retaining said housing in a selected position relative to said swivel mechanism so as to temporarily hold said mirror in one of said plurality of different reflective orientations.

6. A mirror assembly according to claim 1 including:
(a) indexing means providing controlled and incremental rotation of said housing about said swivel mechanism.

7. An adjustable convex mirror assembly, adapted to be mounted on a motor vehicle, said assembly comprising:
(a) an angularly truncated cylindrical housing having a circular base, an oblique edge opposite said base and a longitudinal axis;
(b) a circular mirror mounted on said housing;
 (i) said mirror being convex with a generally fixed radius and a reflecting surface, and having a center, with a rotational axis-of-symmetry passing through said center, and a base;
(c) a swivel mechanism connected to and cooperating with said housing;
 (i) said swivel mechanism having a first component on a tongue and groove mechanism, a base and a substantially planar rear mounting surface;
(d) said housing having a second component of said tongue and groove mechanism such that:
 (i) said housing is rotatably mounted on said swivel mechanism; said tongue and groove mechanism retaining said housing on said swivel mechanism and permitting rotation of said housing relative to said swivel mechanism;
(e) said housing having an axis-of-rotation associated with the rotation of said housing relative to said swivel mechanism; said axis-of-rotation being generally perpendicular to said rear mounting surface; and
(f) said housing also including a circular slot; said mirror base being snugly retained in said slot such that:
 (i) said circular slot asymmetrically mounts said mirror about said axis-of-rotation with said axis-of-symmetry non-colinear and non-parallel with said axis-of-rotation such that rotation of said housing results in movement of said convex mirror through a plurality of different reflective orientations;
(g) whereby rotation of said mirror housing permits selection of a field of view as reflected by said convex mirror to a viewer.

8. A mirror assembly according to claim 7 including:
(a) locking means for retaining said housing in a selected position relative to said swivel mechanism so as to temporarily hold said mirror in one of said plurality of different reflective orientations.

9. A mirror assembly according to claim 7 including:
(a) indexing means providing for controlled and incremental rotation of said housing about said swivel mechanism.

10. An adjustable convex mirror assembly in operational combination with a substantially planar rearview mirror of a motor vehicle;
(a) said planar mirror having a reflective surface with said convex mirror assembly mounted thereon;
(b) said assembly including a housing, a convex mirror, a swivel mechanism, locking means, indexing means and mounting means;
 (i) said housing having an angularly truncated cylindrical body with a circular base, an oblique edge opposite said base, a longitudinal axis, a circular slot and a radially inner groove;
 (ii) said convex mirror being mounted in said housing near said oblique edge and having a crown with a rotational axis-of-symmetry passing through said crown;
 (iii) said swivel mechanism being connected to and cooperating with said housing; said swivel mechanism including a radially outer tongue, a base, and a substantially planar rear mounting surface; said housing being rotatably mounted on said swivel mechanism through cooperation of said tongue and groove; said tongue retaining said swivel mechanism relative to said housing and permitting rotation of said housing about said swivel mechanism;
(c) rotation of said housing defining an axis-of-rotation, said axis-of-rotation being co-linear with said longitudinal axis and generally perpendicular to said rear mounting surface;
 (i) said mirror being asymmetrically mounted relative to said axis-of-rotation and said axis-of-symmetry being non-colinear and non-parallel with said axis-of-rotation such that rotation of said housing results in movement of said convex mirror through a plurality of different reflective orientations;
(d) said locking means retaining said housing in a manually selective position relative to said swivel mechanism so as to temporarily hold said mirror in one of said plurality of different reflective orientations;
(e) said indexing means providing controlled and incremental rotation of said housing about said swivel mechanism; and
(f) said mounting means securing said convex mirror assembly, by said rear mounting surface, onto said planar mirror reflective surface;
(g) whereby rotation of said mirror housing permits selection of a field of view, as reflected by said convex mirror, to a viewer.

11. An adjustable convex mirror assembly adapted to be mounted on a motor vehicle, said assembly comprising:
(a) an angularly truncated cylindrical housing having a circular base, an oblique end opposite said base, an inner sidewall, and a longitudinal axis;
(b) a circular slot in said inner sidewall and located substantially near said oblique end;
(c) a circular convex mirror, having a mirror base, mounted in said circular slot so as to be snugly retained in said housing;
 (i) said convex mirror having a convex reflecting surface of uniform radius with a crown and a rotational axis-of-symmetry passing through said crown;
(d) a swivel mechanism connected to and cooperating with said housing;
 (i) said swivel mechanism having a plate with a first component of a tongue and groove mechanism extending therefrom and a substantially planar rear mounting surface; said plate having a plurality of knob receivers therein, said receivers being spaced apart and forming a circular pattern;
(e) said housing including a second component of a tongue and groove mechanism;
 (i) said housing being rotatably mounted on said swivel mechanism by cooperation of said tongue and groove first and second components; rotation of said housing defining an axis-of-rotation substantially colinear with said housing longitudinal axis and substantially perpendicular to said rear mounting surface;

(ii) said convex mirror being asymmetrically mounted relative to said housing axis-of-rotation with said mirror axis-of-symmetry being non-colinear and non-parallel with said housing axis-of-rotation; and (f) a follower mechanism mounted on said housing inner sidewall; said follower mechanism having an indexing tab with a knob aligned with said swivel mechanism knob receivers such that:

(i) said indexing tab knob is biased into alternative of said knob receivers upon rotation of said housing to temporarily lock said housing in a selected position relative to said swivel mechanism;

(ii) said engagement between said indexing tab knob and said plate being frictional and breakable by rotative force applied to said housing;

(iii) rotation of said housing permitting a plurality of engagements between said indexing tab knob and said knob receivers to provide controlled and incremental rotation of said convex mirror through a variety of reflective orientations;

(g) whereby said convex mirror is selectively positioned into a variety of reflective orientations to present a plurality of reflected fields to a viewer.

12. An adjustable convex mirror assembly according to claim 11 wherein:

(a) said follower mechanism comprises three leaf springs mounted on said inner sidewall; and (b) an indexing tab is associated with each of said leaf springs; each indexing tab being a substantially semi-spherical knob on said leaf spring oriented to engage said knob receivers; rotation of said housing causing said knobs to become associated with different apertures.

13. A mirror assembly according to claim 11 including:

(a) anchoring means for mounting said mirror assembly onto a substantially planar mirror surface;

(i) said anchoring means comprising double-walled tape attached to said swivel mechanism base and said planar mirror.

14. A mirror assembly comprising:

(a) a swivel mechanism with a generally planar mounting base;

(b) a housing rotatably mounted on said swivel mechanism and connected to said swivel mechanism such that said housing has an axis-of-rotation generally perpendicular to said swivel mechanism mounting base;

(c) a convex mirror having a reflective surface with a generally uniform radius of curvature and a mirror base; said mirror having an axis-of-symmetry; and (d) said mirror base being mounted on said housing such that said mirror axis of symmetry is substantially non-parallel to and non-perpendiculr to said housing axis-of-rotation;

(e) whereby rotation to said housing permits selection of various fields of view to a stationary viewer through said mirror.

15. A convex mirror assembly, adapted to be mounted on a motor vehicle, said assembly comprising:

(a) a housing;

(b) a mirror mounted on said housing;

(i) said mirror having a convex reflecting surface with a crown and an axis-of-symmetry passing through said crown;

(c) a rear mounting surface for mounting said assembly onto a planar surface;

(i) said rear mounting surface being substantially planar;

(ii) said mirror being mounted relative to said housing such that said mirror axis-of-symmetry forms a substantially acute angle with said rear mounting surface;

(d) said housing being rotatably mounted in said assembly to rotate about an axis substantially perpendicular to said rear mounting surface.

16. An adjustable convex mirror assembly, adapted to be mounted on a motor vehicle, said assembly comprising:

(a) an angularly truncated cylindrical housing having a circular base, an oblique edge opposite said base and a longitudinal axis;

(b) a circular mirror mounted on said housing;

(i) said mirror being convex with a generally fixed radius and a reflecting surface, and having a center, with a rotational axis-of-symmetry passing through said center, and a base;

(c) a swivel mechanism connected to and cooperating with said housing;

(i) said swivel mechanism having a first component of a tongue and groove mechanism, a base and a rear mounting surface;

(d) said housing having a second component of said tongue and groove mechanism such that:

(i) said housing is rotatably mounted on said swivel mechanism; said tongue and groove mechanism retaining said housing on said swivel mechanism and permitting rotation of said housing relative to said swivel mechanism;

(e) said housing having an axis-of-rotation associated with the rotation of said housing relative to said swivel mechanism; said axis-of-rotation being generally perpendicular to said rear mounting surface;

(f) said housing also including a circular slot; said mirror base being snugly retained in said slot such that:

(i) said circular slot asymmetrically mounts said mirror about said axis-of-rotation with said axis-of-symmetry non-colinear with said axis-of-rotation such that rotation of said housing results in movement of said convex mirror through a plurality of different reflective orientations;

(g) locking means for retaining said housing in a selected position relative to said swivel mechanism so as to temporarily hold said mirror in one of said plurality of different reflective orientations; and (h) indexing means providing for controlled and incremental rotation of said housing about said swivel mechanism;

(i) said swivel mechanism including a plate with a plurality of knob receivers therein, said knob receivers being spaced apart and forming a circular pattern;

(i) said indexing means including a follower mechanism mounted on said housing sidewall; said follower mechanism having an indexing tab with a knob aligned with said swivel mechanism knob receivers such that:

(i) said indexing tab knob is biased into alternative knob receivers upon rotation of said housing to temporarily lock said housing in a selected position relative to said swivel mechanism;
(ii) said engagement between said indexing tab knob and said plate is frictional and is breakable by rotative force applied to said housing;
(iii) rotation of said housing permits a plurality of engagements between said indexing tab knob and said plate knob receivers to provide controlled and incremental rotation of said convex mirror through a variety of reflective orientations;
(j) whereby rotation of said mirror housing permits selection of a field of view as reflected by said convex mirror to a viewer.

17. An adjustable convex mirror assembly in operational combination with a substantially planar rearview mirror of a motor vehicle, wherein said operational combination:
(a) said planar mirror has a reflective surface with said convex mirror assembly mounted thereon;
(b) said assembly includes a housing, a convex mirror, a swivel mechanism, locking means, indexing means and mounting means;
  (i) said housing having an angularly truncated cylindrical body with a circular base, an oblique edge opposite said base, a longitudinal axis, a circular slot and a radially inner groove;
  (ii) said convex mirror being mounted in said housing near said oblique edge and having a crown with a rotational axis-of-symmetry passing through said crown;
  (iii) said swivel mechanism being connected to and cooperating with said housing; said swivel mechanism including a radially outer tongue, a base, and a rear mounting surface; said housing being rotatably mounted on said swivel mechanism through cooperation of said tongue and groove; said tongue retaining said swivel mechanism relative to said housing and permitting rotation of said housing about said swivel mechanism;
  (iv) said swivel mechanism further including a plate with said tongue extending therefrom and a plurality of knob receivers therein, said knob receivers being spaced apart and forming a circular pattern;
(c) rotation of said housing defining an axis-of-rotation, said axis-of-rotation is co-linear with said longitudinal axis and generally perpendicular to said rear mounting surface;
  (i) said mirror being asymmetrically mounted relative to said axis-of-rotation; and, said axis-of-symmetry being non-colinear with said axis-of-rotation of said housing such that rotation of said housing results in movement of said convex mirror through a plurality of different reflective orientations;
(d) said locking means retaining said housing in a manually selective position relative to said swivel mechanism so as to temporarily hold said mirror in one of said plurality of different reflective orientations;
(e) said indexing means provides controlled and incremental rotation of said housing about said swivel mechanism;
  (i) said indexing means including a follower mechanism mounted on said housing sidewall; said follower mechanism having an indexing tab with a knob aligned with said swivel mechanism knob receivers such that: said indexing tab knob is biased into alternative knob receivers upon rotation of said housing to temporarily lock said housing in a selected position relative to said swivel mechanism; said engagement between said indexing tab knob and said plate is frictional and breakable by rotative force applied to said housing; and, rotation of said housing permits a plurality of engagements between said indexing tab knob and said plate knob receivers to provide controlled and incremental rotation of said convex mirror through a variety of reflective orientations;
(f) said mounting means securing said convex mirror assembly, by said rear mounting surface, onto said planar mirror reflective surface;
(g) whereby rotation of said mirror housing permits selection of a field of view, as reflected by said convex mirror, to a viewer.

18. A mirror assembly comprising:
(a) a swivel mechanism with a generally planar mounting base;
  (i) said swivel mechanism including a plate with a plurality of knob receivers therein, said knob receivers being spaced apart and forming a circular pattern;
(b) a housing rotatably mounted on said swivel mechanism and connected to said swivel mechanism such that said housing has an axis-of-rotation generally perpendicular to said swivel mechanism mounting base;
(c) a convex mirror having a reflective surface with a generally uniform radius of curvature and a mirror base; said mirror having an axis-of-symmetry;
(d) said mirror base being mounted on said housing such that said mirror axis-of-symmetry is substantially non-parallel to and non-perpendicular to said housing axis-of-rotation;
(e) indexing means comprising a follower mechanism mounted in said housing; said follower mechanism having an indexing tab with a knob aligned with said swivel mechanism knob receivers such that:
  (i) said indexing tab is biased into alternative knob receivers upon rotation of said housing to temporarily lock said housing in a selected position relative to said swivel mechanism;
  (ii) said engagement between said indexing tab knob and said plate is frictional and breakable by rotative force applied to said housing; and
  (iii) rotation of said housing permits a plurality of engagements between said indexing tab knob and said knob receivers to provide controlled and incremental rotation of said convex mirror through a variety of reflective orientations;
(f) whereby rotation of said housing permits selection of various fields of view, to a stationary viewer, through said mirror.

19. A mirror assembly according to claim 18 in combination with:
(a) a planar mirror surface;
  (i) said swivel mechanism being mounted on said surface such that said housing axis-of-rotation is generally perpendicular to a plane defined by said planar surface.

20. A mirror assembly according to claim 18 wherein:
(a) said housing has an angularly truncated cylindrical body with a circular base, an oblique edge opposite said base, a longitudinal axis, a circular slot, and, a radially inner groove; and (b) said swivel mechanism is connected to and cooperates with said housing; said swivel mechanism including a radially outer tongue, a base, and a rear mounting surface; said housing being rotatably mounted on said swivel mechanism through cooperation of said tongue and groove; said tongue retaining said swivel mechanism relative to said housing and permitting rotation of said housing about said swivel mechanism.

21. An adjustable mirror assembly, adapted to be mounted on a motor vehicle, said assembly comprising:
 (a) a housing;
 (b) a mirror mounted on said housing;
   (i) said mirror having a reflecting surface;
 (c) a swivel mechanism connected to and cooperating with said housing;
   (i) said housing swivel mechanism having a substantially planar rear mounting surface for mounting said assembly on the vehicle;
   (ii) said housing being rotatably mounted on said swivel mechanism such that said housing has an axis-of-rotation associated therewith; said axis-of-rotation being generally perpendicular to said swivel mechanism rear mounting surface;
   (iii) said mirror being asymmetrically positioned relative to said axis-of-rotation such that rotation of said housing results in movement of said mirror through a plurality of different reflective orientations;
 (d) locking means for retaining said housing in a selected position relative to said swivel mechanism so as to temporarily hold said mirror in one of said plurality of different reflective orientations;
 (e) indexing means providing for controlled and incremental rotation of said housing about said swivel mechanism;
   (i) said swivel mechanism including a plate with a plurality of knob receivers therein, said knob receivers being spaced apart and forming a circular pattern; and
 (f) said indexing means including a follower mechanism mounted on said housing; said follower mechanism having at least one indexing tab with a knob aligned with said swivel mechanism knob receivers such that:
   (i) said indexing tab knob is biased into alternative knob receivers upon rotation of said housing to temporarily lock said housing in a selected position relative to said swivel mechanism;
   (ii) said engagement between said indexing tab and said plate is frictional and is breakable by rotative force applied to said housing; and
   (iii) rotation of said housing permits a plurality of engagements between said indexing tab knob and said plate knob receivers to provide controlled and incremental rotation of said mirror through a variety of reflective orientations;
 (g) whereby rotation of said mirror housing permits selection of a field of view as reflected by said mirror to a viewer.

* * * * *